United States Patent
Robison (10) Patent No.: US 7,624,386 B2
(45) Date of Patent: Nov. 24, 2009

(54) FAST TREE-BASED GENERATION OF A DEPENDENCE GRAPH

(75) Inventor: Arch D. Robison, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 11/016,144

(22) Filed: Dec. 16, 2004

(65) Prior Publication Data

US 2006/0136468 A1    Jun. 22, 2006

(51) Int. Cl.
  *G06F 9/45* (2006.01)
(52) U.S. Cl. ................... 717/144; 717/159
(58) Field of Classification Search ............ 717/144, 717/152, 159, 161
See application file for complete search history.

(56) References Cited

U.S. PATENT DOCUMENTS

| | | | |
|---|---|---|---|
| 5,317,734 A | | 5/1994 | Gupta |
| 5,327,561 A * | | 7/1994 | Choi et al. .................. 717/157 |
| 5,802,373 A * | | 9/1998 | Yates et al. ................. 717/139 |
| 6,044,222 A * | | 3/2000 | Simons et al. .............. 717/156 |
| 6,260,190 B1 * | | 7/2001 | Ju .............................. 717/156 |
| 6,356,902 B1 * | | 3/2002 | Tan et al. .................... 707/10 |
| 6,516,463 B2 * | | 2/2003 | Babaian et al. ............. 717/156 |
| 6,675,380 B1 | | 1/2004 | McKinsey et al. |
| 6,832,370 B1 | | 12/2004 | Srinivasan et al. |
| 7,007,271 B2 | | 2/2006 | Kumar et al. |
| 7,058,937 B2 | | 6/2006 | Fu et al. |
| 2003/0196197 A1 | | 10/2003 | Fu et al. |
| 2003/0200540 A1 | | 10/2003 | Kumar et al. |
| 2004/0073541 A1 * | | 4/2004 | Lindblad et al. ............... 707/3 |
| 2005/0125786 A1 | | 6/2005 | Dai et al. |
| 2005/0216899 A1 | | 9/2005 | Muthukumar et al. |
| 2006/0026582 A1 * | | 2/2006 | Collard et al. .............. 717/161 |
| 2006/0200816 A1 | | 9/2006 | Pramanick et al. |

FOREIGN PATENT DOCUMENTS

EP        977128 A1 *    2/2000

OTHER PUBLICATIONS

Bacon et al. "Compiler Transformations for High-Performance Computing" Dec. 1994, ACM Computing Surveys, vol. 26 No. 4.*
Moon, S. and Ebcioğlu, K. 1997. Parallelizing nonnumerical code with selective scheduling and software pipelining. ACM Trans. Program. Lang. Syst. 19, 6 (Nov. 1997), 853-898. DOI= http://doi.acm.org/10.1145/267959.269966.*
U.S. Appl No. 10/881,030 Office Action Mailed Jun. 4, 2007.
"U.S. Appl. No. 10/881,030 Final Office Action Mailed Nov. 13, 2007".
"Webopedia—Bitwise Operator", http://web.archive.org/web/20021226121822/attp://www.webopedia.com/TERM/B/bitwise...5/25/2007, (Sep. 1, 1997), 1-2.
Fu, C. , et al., "Efficient Modeling of Itanium Architecture During Instruction Scheduling Using Extended Finite State Automata", *Journal of Instruction-Level Parallelism*, (Apr. 2004), 26 pages.

* cited by examiner

*Primary Examiner*—James Rutten
(74) *Attorney, Agent, or Firm*—Blakely, Sokoloff, Taylor & Zafman LLP (57) ABSTRACT

A dependence graph having a linear number of edges and one or more tie vertices is generated by constructing a tree of nodes, receiving requests to create cut and/or fan vertices corresponding to each node, adjusting a frontier of nodes up or down, and creating one or more cut or fan vertices, zero or more tie vertices, and at least one predecessor edge.

20 Claims, 8 Drawing Sheets

```
Vertex MAKE_FAN( Node n ) {
    ADJUST_FRONTIER(n);
    v = new Vertex;
    add edge n.last_cut→v;
    n.fan_set = n.fan_set∪{v}
    return v;
}
```

```
Vertex procedure MAKE_CUT( Node n ) {
    ADJUST_FRONTIER(n);
    Vertex v = new Vertex;
    if n.fan_set is not empty then
            foreach Vertex u in n.fan_set do
                add edge u→v
            endfor
    else
        add edge n.last_cut→v
    endif
    n.last_cut = v;
    n.fan_set = {};
    return v;
}
```

Fig. 8

```
900 procedure ADJUST_FRONTIER( Node n ) {
    if n.child_set is empty then
        if n.parent is empty then
            // Node is on the frontier
        else
            // Node is below frontier
            EXTEND_DOWN(node);
        endif
    else
        // Node is above frontier.
        if GATHER_UP( n, n ) then
            // At least one cut point was exposed
            CONVERT_TO_CUT(n)
        endif
    endif
}
```

Fig. 9

```
1000 procedure CONVERT_TO_CUT( Node n ) {
    if n.fan_set is not empty then
        if n.fan_set contains only one vertex then
            // The singleton vertex becomes the cut
            n.last_cut = the vertex in n.fan_set;
        else
            // Add a tie vertex
            Vertex v = new Vertex;
            foreach Vertex u in n.fan_set do
                add edge u → v;
            endfor
        endif
        n.fan_set = {};
    endif
}
```

```
procedure EXTEND_DOWN( Node n ) {
    // Find nearest ancestor that is on frontier.
    Node p = n;
    while p.parent ≠ NULL do
        p=p.parent;
    endwhile
    // Get a representative "most recent node" for
    // the ancestor.
    CONVERT_TO_CUT(p);
    // Mark  nodes on path up from n to just below p
    // as on or above frontier.
    Node c = n;
    while c ≠ p do
        c.parent.child_set = c.parent.child_set ∪ {c};
        c.last_cut = p.last_cut;
        Node next = c.parent;
        c.parent = NULL;
        c = next;
    endwhile
}
```

```
bool procedure GATHER_UP( Node n, Node focus ) {
    bool has_cut = false;
    foreach child c in n.child_set do
        if c.child_set is nonempty then
            // Recurse
            has_cut = has_cut ∨ GATHER_UP(c,focus);
        else
            if c.last_cut==focus.last_cut then
                // No cut was added to child after was
                // it was created by EXTEND_DOWN.
                focus.fan_set = focus.fan_set ∪ child.fan_set;
            else
                // Cut was added to child.
                // It inherently comes after n.last_cut
                has_cut = true;
                if c.fan_set is not empty then
                    // Child's fans come after the child's cut.
                    focus.fan_set = focus.fan_set ∪ child.fan_set;
                else
                    focus.fan_set = focus.fan_set ∪ {child.last_cut};
                endif
            endif
        endif
        // Mark c as below frontier by changing its
        // parent from NULL to n.
        c.parent = n;
    endfor
    n.child_set = {};
    return has_cut;
}
```

Fig. 12

FAST TREE-BASED GENERATION OF A DEPENDENCE GRAPH

BACKGROUND

The present invention relates to instruction schedulers and more specifically to dependence graphs used for scheduling instructions.

A dependence graph consists of a set of vertices and directed edges between those vertices. The vertices represent machine instructions or pseudo instructions.

Figure 1:
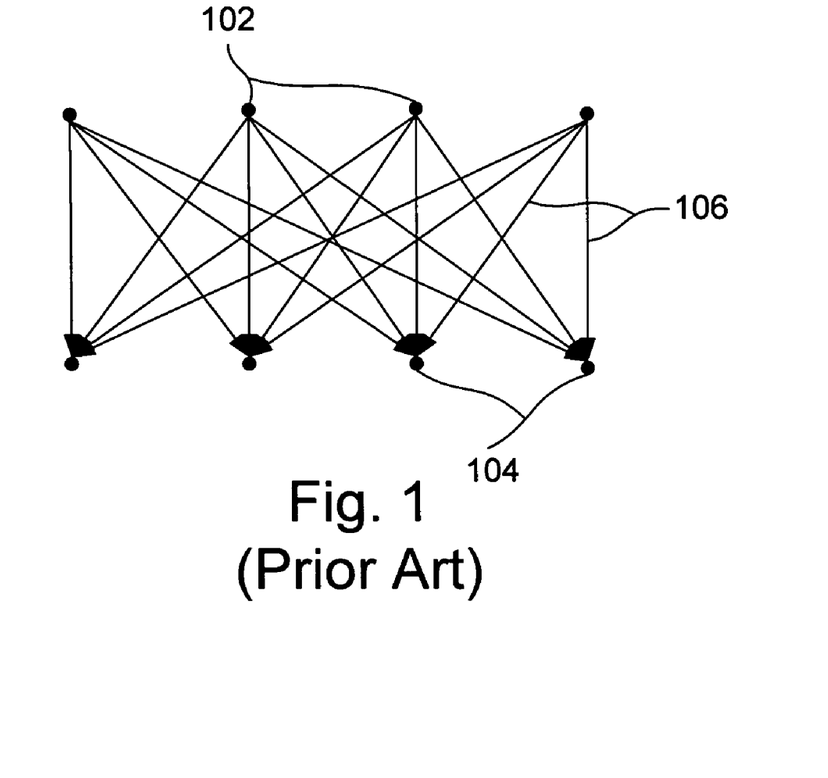
FIG. 1 is an illustration of a typical dependence graph

An example of a dependence graph is illustrated in FIG. 1. The four top vertices in the graph (102) represent writes to four distinct locations. The four bottom vertices (104) represent reads, via pointers, that might read any of the four locations. The edges in the graph (106) show the dependences.

In general, for a dependence graph or subgraph having M writes followed by N reads, where M and N are integers, the dependence graph can have up to M×N edges. Thus, a worst case dependence graph will have a number of edges that is quadratic in the number of vertices. This is detrimental, because it takes quadratic time to generate a dependence graph having a quadratic number of edges, and causes instruction scheduling to take quadratic time as well. This is particularly a problem if compilation time is an issue, such as for Just-In-Time (JIT) compilers.

BRIEF DESCRIPTION OF THE DRAWINGS

A better understanding of the present invention can be obtained from the following detailed description in conjunction with the following drawings, in which.

DETAILED DESCRIPTION

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Embodiments of the present invention concern the generation of dependence graphs having a linear number of edges during instruction scheduling. The vertices of a dependence graph represent machine instructions or pseudo instructions. One pseudo instruction used in embodiments of the present invention is "tie," which ties together dependences on two or more nodes. By introducing tie vertices, the number of edges in a dependence graph may be reduced to M+N, for M writes and N reads, thus preserving sparsity. This allows a dependence graph with a linear number of edges to be built in linear time.

Figure 2:
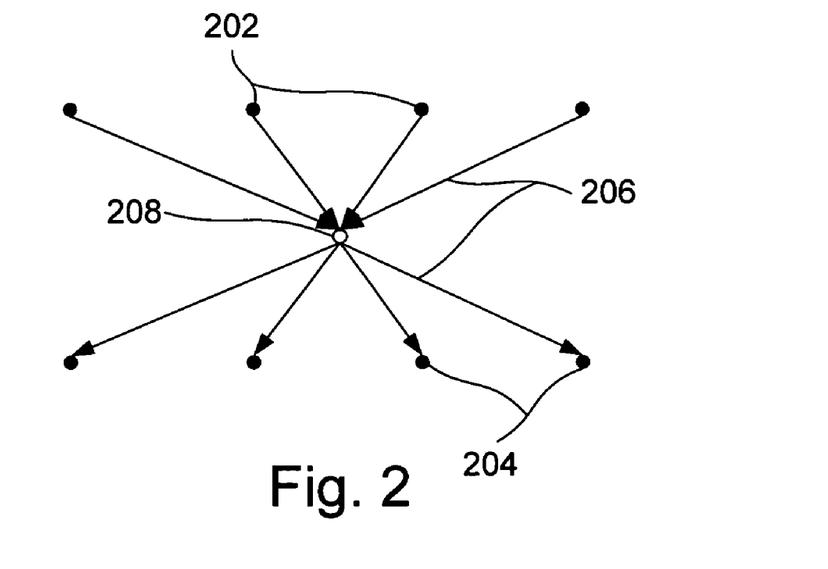
FIG. 2 is an illustration of a dependence graph generated in accordance with an embodiment of the present invention

FIG. 2 illustrates an example of a dependence graph generated according to one embodiment of the present invention. The four top vertices in the graph (202) represent writes to four distinct locations. The four bottom vertices (204) represent reads, via pointers, that might read any of the four locations. The dependence graph includes a "tie" vertex (208). The use of a tie vertex reduces the number of edges (206) in the dependence graph to a linear number of edges.

Figure 3:
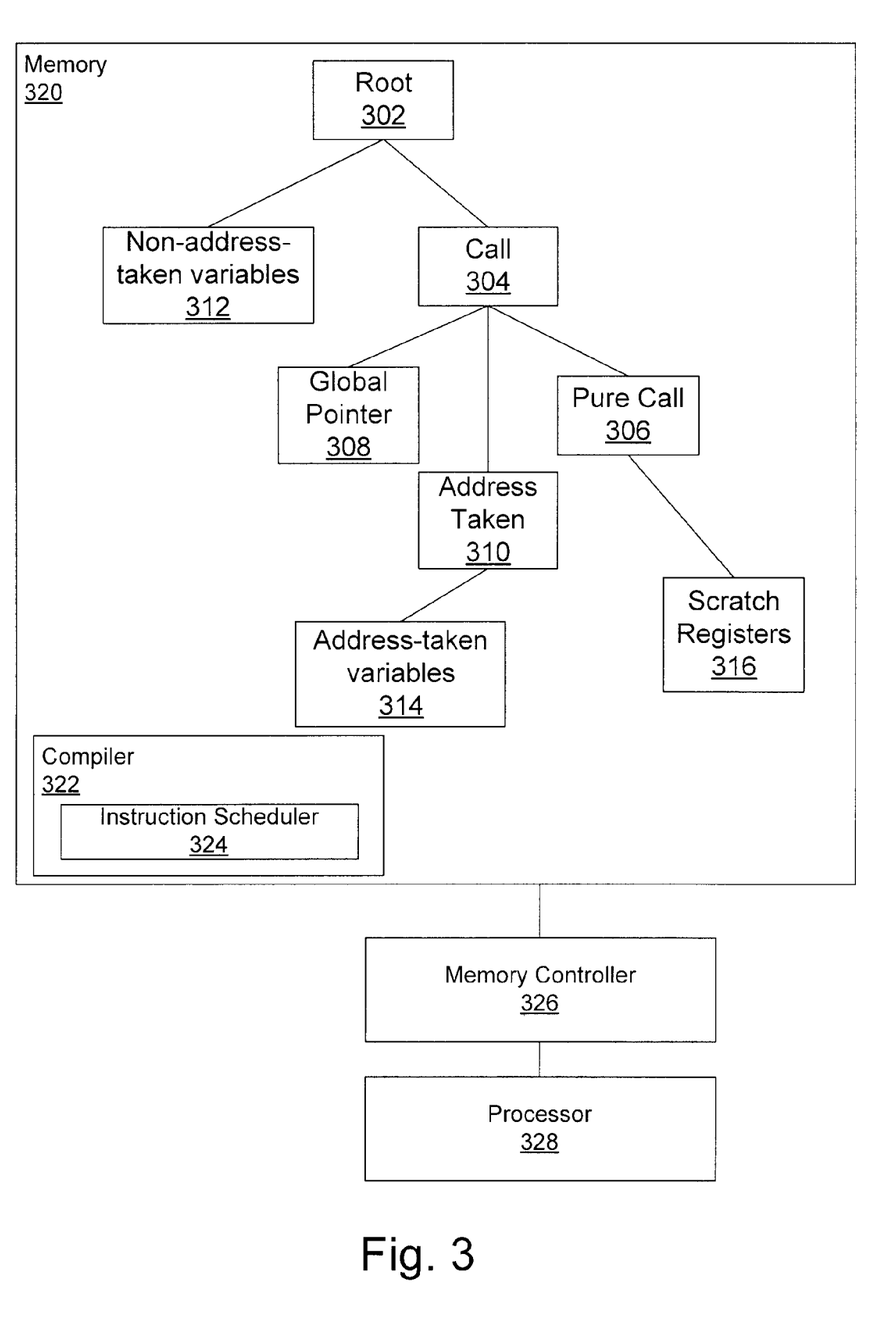
FIG. 3 is an illustration of a tree of nodes employed in embodiments of the present invention

Embodiments of the present invention use a hierarchical tree of "nodes" to generate a dependence graph. Each node represents one or more memory locations. Each parent node represents the locations represented by its children, and possibly additional locations. An example tree is illustrated in FIG. 3. Each node in the tree is shown by a box and represents a location or group of locations in memory 320. The root (302) represents all locations. The "Call" node (304) represents all locations that might be modified by a call. The "Pure Call" node (306) represents only those locations that might be modified by a call that does not read or write memory. The "Global Pointer" node (308) is a leaf node representing a register that is read or written by a call. The "Address Taken" node (310) is leaf node representing variables that may be the targets of pointers; i.e., referenced indirectly. Other nodes may include "Non-address-taken variables" (312), "Address-taken variables" (314), and "Scratch registers" (316), which represent one or more siblings. The tree may also include other nodes not illustrated here. Some of the nodes illustrated as leaves could be changed to be subtrees themselves.

A dependence graph may be built from the hierarchical tree of nodes in conjunction with a sequence of requests. Each request is related to one of the nodes in the tree. The requests reference locations, and are assumed to read or write locations, or call subroutines that execute sequences of instructions. The locations may be real or virtual registers, or memory.

Figure 4:
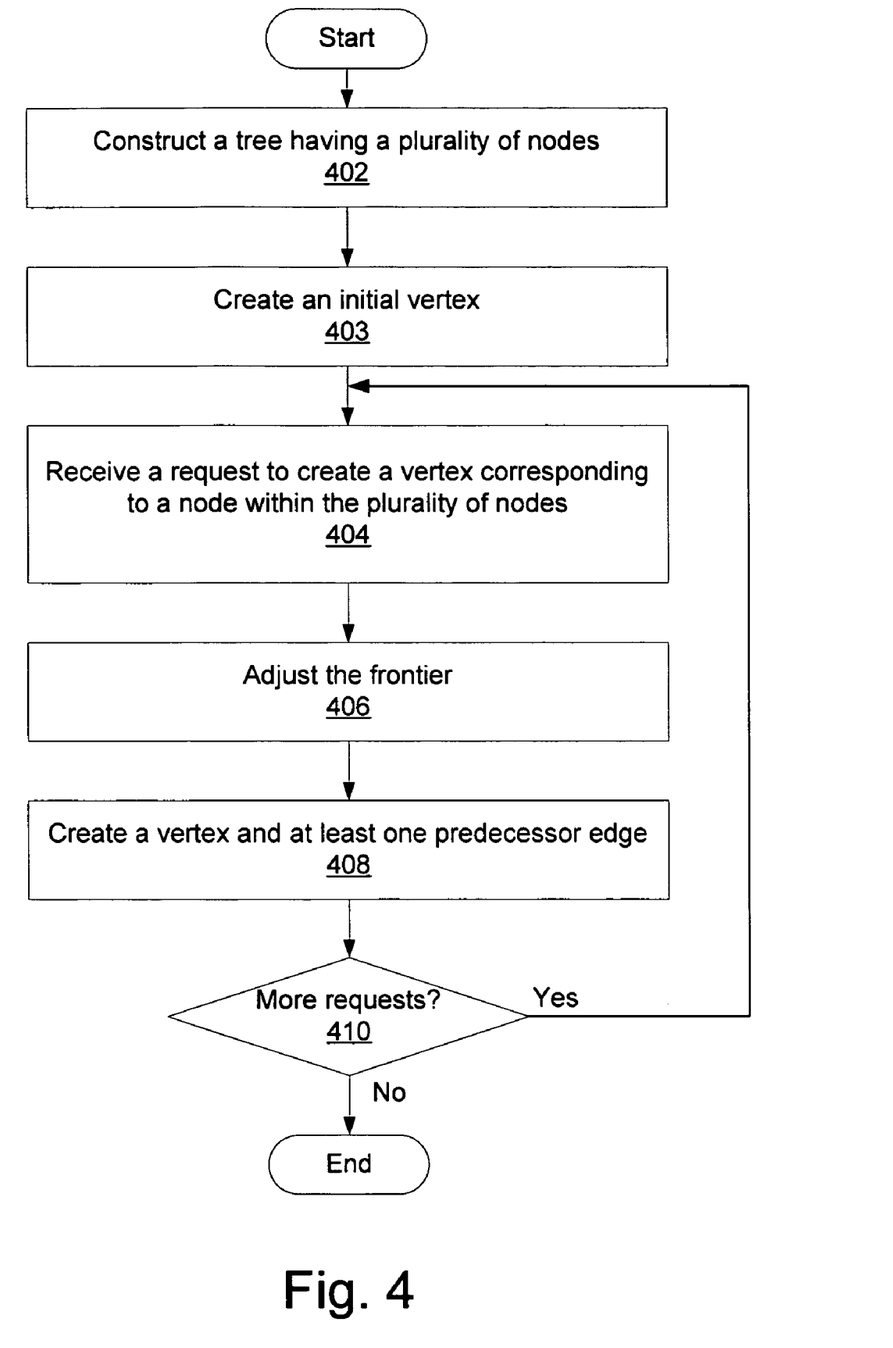
FIG. 4 is a flowchart illustrating generation of a dependence graph according to one embodiment of the present invention

FIG. 4 is a flowchart which illustrates a method to generate a dependence graph according to one embodiment of the present invention. First, as shown in block 402, a hierarchical tree having a plurality of nodes is constructed. In one embodiment, the hierarchical tree may be similar to the tree illustrated in FIG. 3.

An initial vertex is created, as shown in block 403. This vertex precedes all other vertices in the dependence graph being constructed.

Next, as shown in block 404, a request to create a vertex corresponding to a node within the tree is received. In one embodiment, the request may be a request to make a "cut" vertex. A cut vertex of a node n is one that comes after, in the partial order represented by the dependence graph, every vertex of n and its children that were constructed earlier. Typically, a cut vertex corresponds to a write operation to the location represented by node n. In another embodiment, the request may be a request to make a "fan" vertex. A fan vertex of a node n is one that comes after all cut vertices for n and its children that were constructed earlier. Typically, a fan vertex corresponds to a read operation of the location represented by node n. However, cut and/or fan vertices may be created to enforce other instruction dependences besides read and write dependences.

After the request is received, a frontier of nodes is adjusted. The frontier of nodes is a group of nodes that are associated with recent cut or fan vertices, and thus relevant to future requests. The frontier may be adjusted up or down to envelop one or more nodes. For example, if the node is below the frontier, the frontier may be moved down to envelop the node. If the node is above the frontier, the frontier may be moved up to envelop the node. The frontier is discussed in greater detail in conjunction with FIG. 6, below.

Next, a vertex and at least one predecessor edge are created, as shown in block 408. In addition to the vertex, one or more tie vertices may also be created to tie together dependences on two or more nodes. The tie vertices are created as necessary to maintain linearity (or sparsity) of the graph.

If there are no more requests, the generation of the dependence graph is complete. If there are more requests to create vertices, blocks 404 through 408 are repeated until the generation of the dependence graph is complete, as illustrated by block 410.

Thus, a dependence graph with a linear number of edges may be generated, which allows an instruction scheduler to quickly and efficiently schedule instructions.

Figure 5:
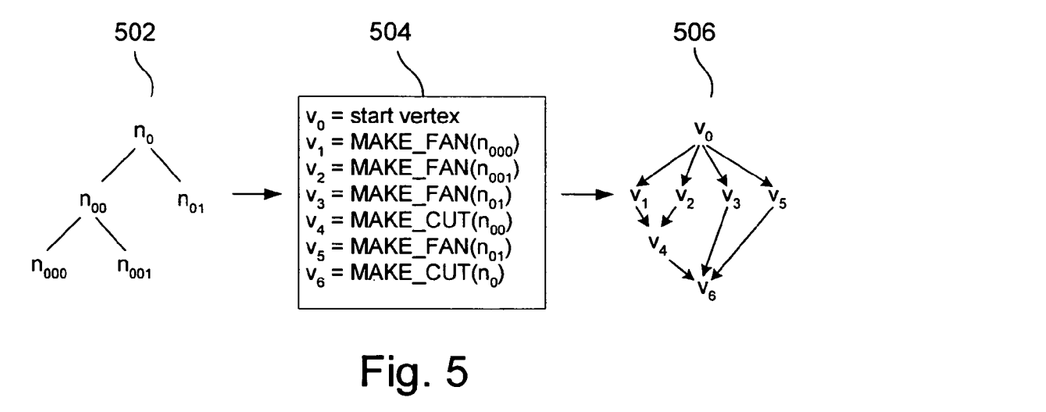
FIG. 5 is an illustration of how a dependence graph is generated from a tree of nodes according to one embodiment of the present invention

FIG. 5 is an example illustration of how a dependence graph (506) is generated from a hierarchical tree (502) according to one embodiment of the present invention. Once a tree of nodes (502) has been constructed, a sequence of requests to make cut or fan vertices is received (504). The requests for cut and fan vertices are generated as the instruction stream to be scheduled is forwardly traversed. For each instruction, a request for a cut or fan vertex is made corresponding respectively to locations read or written by the instruction.

As the requests (504) are received, they are processed, and for each request, a vertex (i.e. $v_1$-$v_6$) and one or more predecessor edges are created in the dependence graph (506). For example, when the request '$v_1$=MAKE_FAN($n_{000}$)' is received, node $v_1$ is created, along with the predecessor edge from node $v_0$ to $v_1$. Similarly, when the request '$v_4$=MAKE_CUT($n_{00}$)' is received, node $v_4$ is created, along with the predecessor edges from node $v_1$ to $v_4$ and from node $v_2$ to $v_4$. The creation of the vertices is dependent upon the relative positions of the nodes within the tree.

Figure 6:
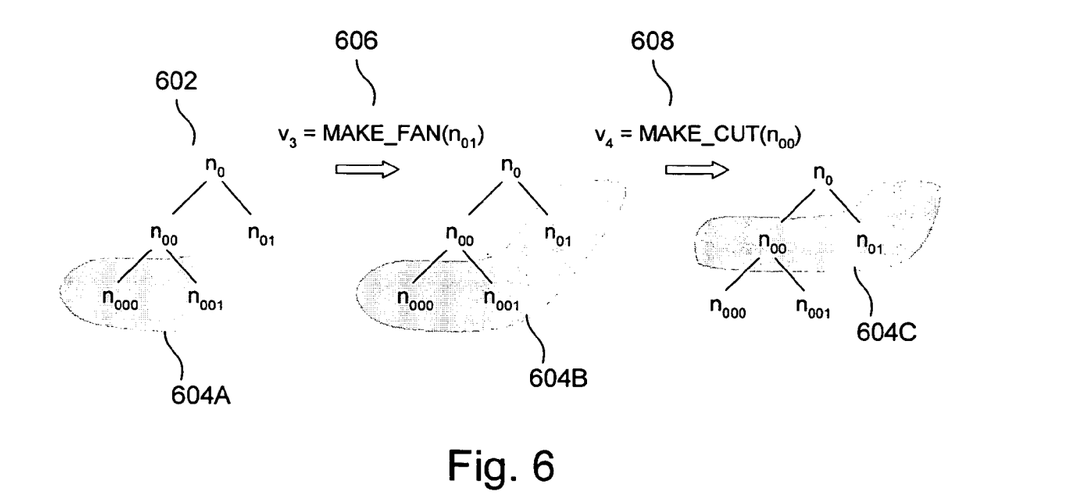
FIG. 6 is an illustration of a frontier of nodes maintained by embodiments of the present invention

FIG. 6 illustrates the movement of the frontier up and down to include nodes in the hierarchical tree of nodes (602) that are associated with recent cut or fan vertices. These vertices form the end of the partially constructed dependence graph because they have no successors yet. The frontier tracks nodes in the tree that are relevant to future requests. The initial frontier illustrated (604A) is the frontier as it exists after vertex $V_2$ has been created in FIG. 5, above. When the request '$v_3$=MAKE_FAN($n_{01}$)' is received (606), to create vertex $v_3$ the frontier is moved downwards to envelop node $n_{01}$ (604B). Similarly, to create vertex $v_4$ when the request '$v_4$=MAKE_CUT($n_{00}$)' is received (608), the frontier is moved upwards to envelop node $n_{00}$ (604C).

In one embodiment, each node in the hierarchical tree of nodes has four associated attributes: child_set, parent, last_cut, and fan_set. The child_set attribute indicates the children of the node that are on or above the frontier. The parent attribute indicates the parent of the node, if the node is below the frontier. If the node is above the frontier, the parent attribute is NULL. The last_cut attribute indicates the most recent cut vertex for each node if the node is on the frontier. If the node is above the frontier, the last_cut attribute indicates a cut vertex that is either equal to, or must come before, each child's last_cut for each child in the node's child_set. The fan_set attribute indicates the set of fan vertices for the node that must come after last_cut for nodes on the frontier. If a node is not on the frontier, this attribute is NULL.

The initial state for each node is with child_set and fan_set initialized to empty, and parent and last_cut initialized to NULL. The root node may have last_cut initialized to a "start" vertex that precedes all other vertices in the dependence graph.

Figure 7:
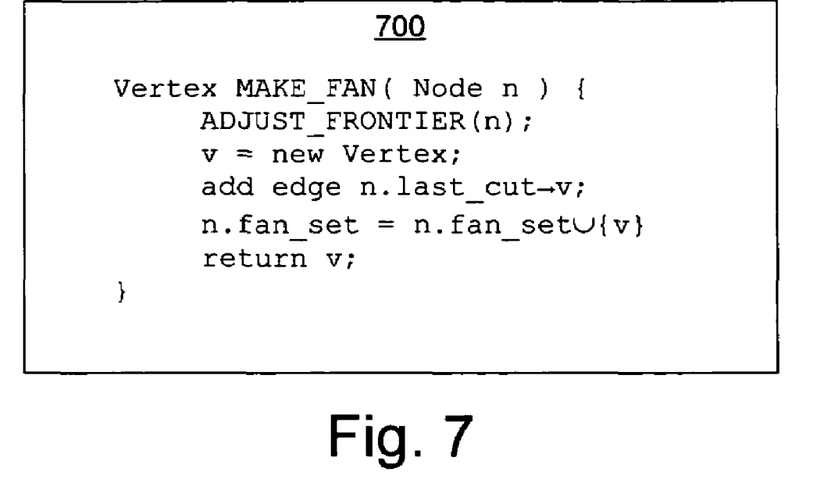
FIGS. 7-12 are pseudocode descriptions of embodiments of the present invention

FIG. 7 illustrates pseudocode (700) for a procedure to construct a new fan vertex for node n, according to one embodiment of the present invention. To create a new fan vertex using the MAKE_FAN procedure, first, the frontier is adjusted to include n. Then the last_cut attribute of node n becomes the predecessor of the new vertex, and the new vertex is added to the fan_set attribute of node n.

Figure 8:
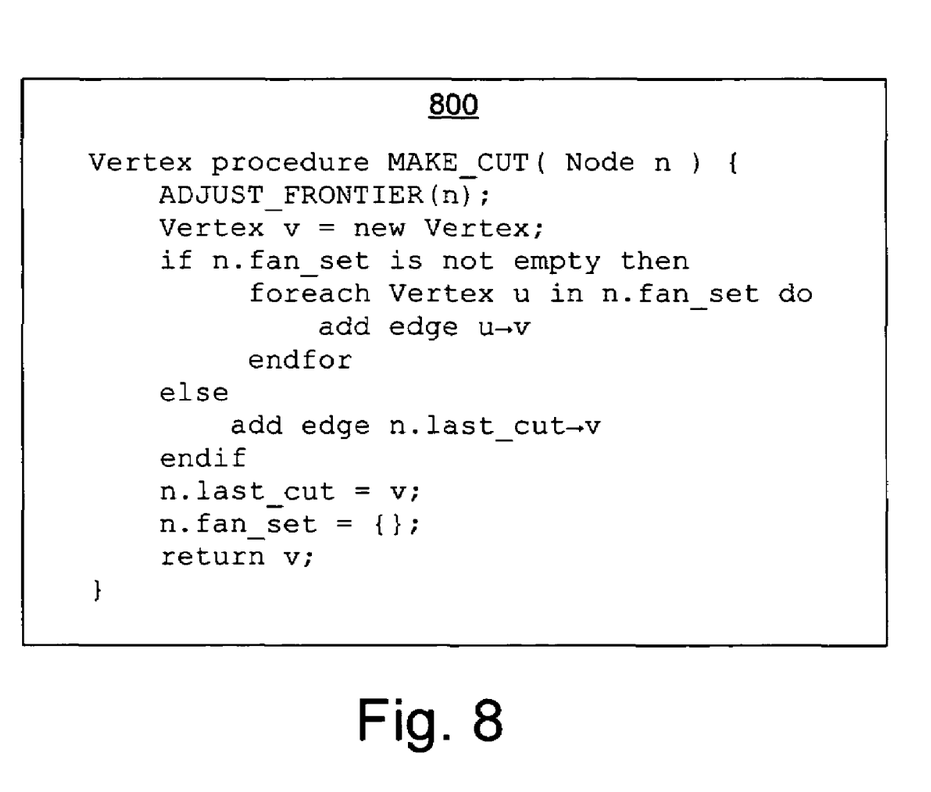

FIG. 8 illustrates pseudocode (800) for a procedure to construct a new cut vertex for node n, according to one embodiment of the present invention. To create a new cut vertex for node n, using the MAKE_CUT procedure, first the frontier is adjusted to include n. Next, if n has any fan vertices, these are made the predecessors of the new cut vertex. If n does not have any fan vertices, the prior cut vertex becomes the predecessor. Then, the fan_set and last_cut attributes for the node are updated so that the new vertex is now the most recent cut vertex for node n.

Figure 9:
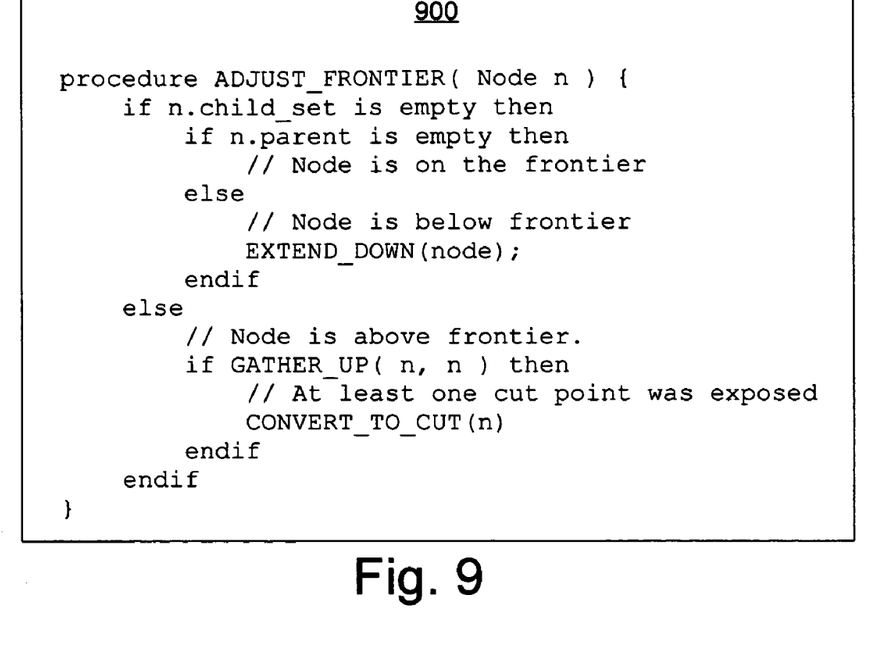

FIG. 9 illustrates pseudocode (900) for a procedure to raise or lower the frontier according to one embodiment of the present invention. The ADJUST_FRONTIER procedure directs the work of raising or lowering the frontier to include a specified node n. By inspecting the child_set and parent attributes of node n, this procedure determines if n is on, below, or above the frontier. If n is below the frontier, the frontier is pulled downwards to it by another procedure, EXTEND_DOWN. If n is above the frontier, the frontier is raised up to it by another procedure GATHER_UP. If the raising of the frontier causes at least one cut vertex to be raised, then this vertex and any other similarly raised cut vertices must precede any subsequent fan or cut vertices. Another procedure, CONVERT_TO_CUT, may be called to enforce this requirement.

Figure 10:
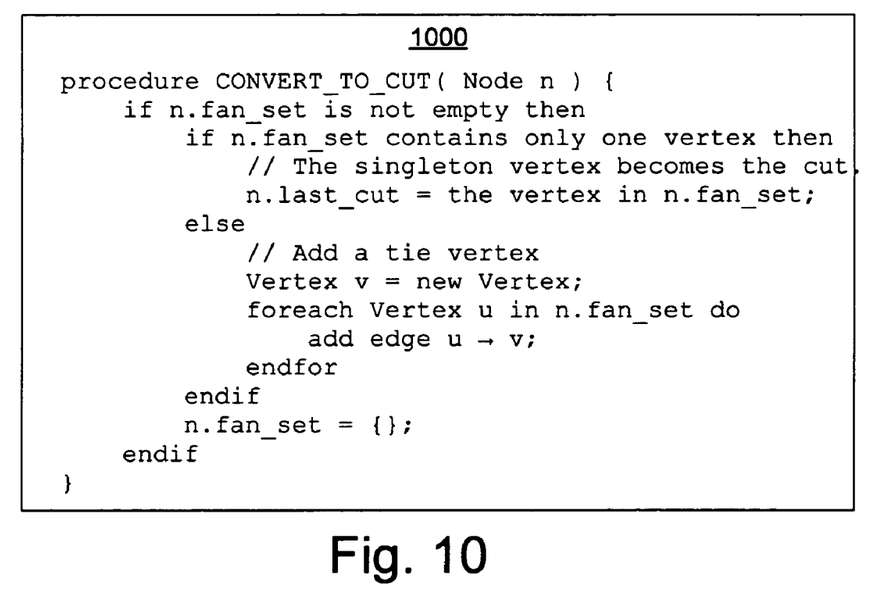

FIG. 10 illustrates pseudocode (1000) for a procedure to leave node n with an empty fan_set attribute and to set the last_cut attribute to a vertex that is equal to or comes after all vertices that were previously at the end of the portion of the dependence graph related to n, according to one embodiment of the present invention. If fan_set is already empty when the CONVERT_TO_CUT procedure is called, nothing is done. If fan_set is a singleton set (i.e. having only one element), then the new last_cut attribute becomes the current fan_set attribute. If fan_set contains more than one element, the nodes in fan_set are tied together by introducing a new tie node that becomes the new last_cut attribute for node n.

Figure 11:
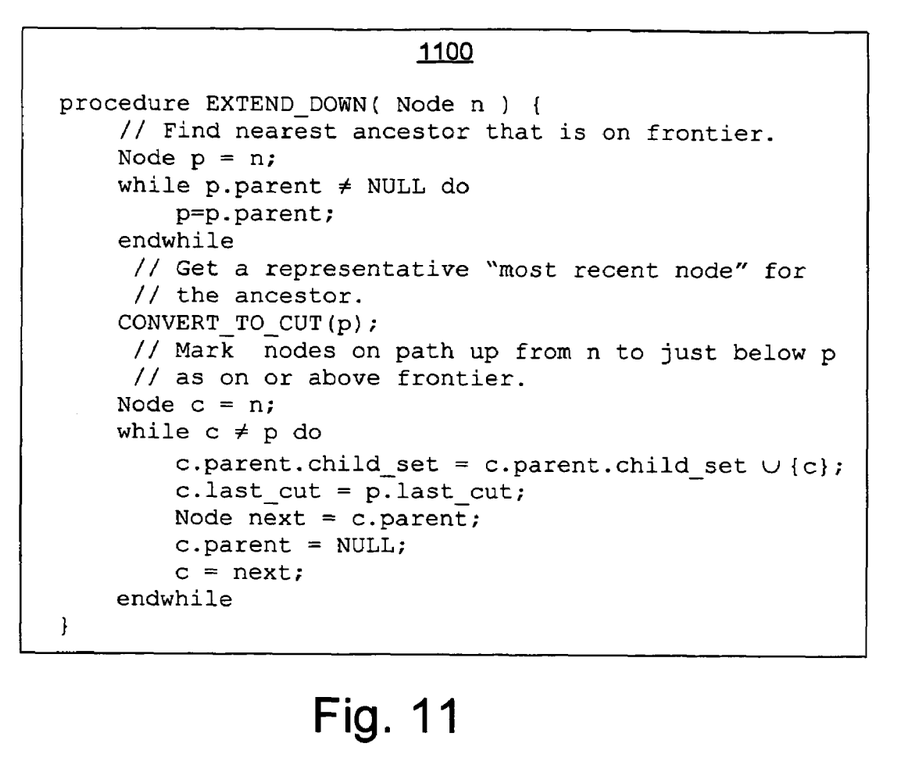

FIG. 11 illustrates pseudocode (1100) for a procedure to pull the frontier down to node n according to one embodiment of the present invention. The EXTEND_DOWN procedure first follows the parent links upwards from node n to find the nearest ancestor node p that is on the frontier. Then it invokes the CONVERT_TO_CUT procedure of FIG. 10 to force the fan_set attribute for ancestor node p to be empty. Finally, for all nodes beyond p downwards towards n, the last_cut attribute for these nodes is set to the last_cut attribute of node p. Thus, the ancestor node is operated on as if a write to it occurred, and that write is recorded as the more recent write for all nodes on the path from the original node up to its ancestor on the frontier.

Figure 12:
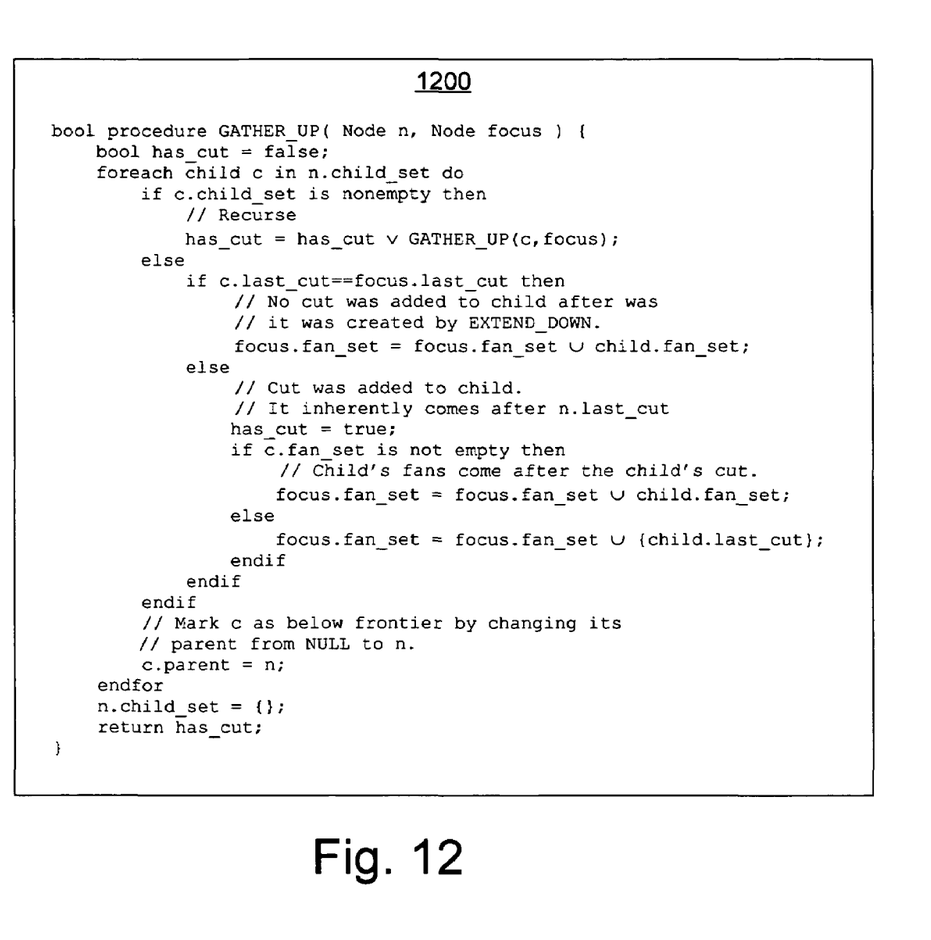

FIG. 12 illustrates pseudocode (1200) for a recursive procedure to push the frontier up to node n according to one embodiment of the present invention. This procedure operates on a node n, which is either node focus or, when recursing, a descendant of node focus, to push the frontier up to the focus. The vertices owned by n and its children are gathered up and made part of node focus's fan_set attribute. A true value is returned if any of the children's vertices were cut vertices. Thus, nodes are recursively gathered, and a record is kept of which nodes are on the frontier.

In embodiments of the present invention, some precision may be sacrificed for the sake of linear sparcity. For example, if ADJUST_FRONTIER is pulling up the frontier on behalf of MAKE_FAN, and some fan vertices are pulled up along with cut vertices, they will all become predecessors of the tie vertex created by the call to CONVERT_TO_CUT, even though in a precise dependence graph, only the cuts must be predecessors of the tie vertex; the fans could be siblings of the new fan vertex. Also, in EXTEND_DOWN, if the parent node's fan_set attribute is not empty, the fan vertices in it will become predecessors of any new fan vertices for node n or its children, whereas in a perfectly accurate dependence graph, the former fan vertices would not have a precedence relationship with any new fan vertices.

Embodiments of the present invention may be implemented on any computer system, including but not limited to a desktop computer, a laptop computer, a notebook computer, a personal digital assistant (PDA), a server, a workstation, a cellular telephone, a mobile computing device, an Internet appliance, or any other type of computing device.

The computer system of FIG. 3 includes at least a processor 328 and memory or other machine accessible medium 320 coupled to the processor 328. As used in this specification, a "machine" includes, but is not limited to, any data processing device with one or more processors. A machine-accessible medium includes any mechanism that stores information in any form accessible by a data processing device, including but not limited to recordable/non-recordable media (such as read only memory (ROM), random access memory (RAM), magnetic disk storage media, optical storage media, and flash memory devices). In one embodiment, the machine accessible medium may be volatile memory such as Synchronous Dynamic Random Access Memory (SDRAM), Dynamic Random Access Memory (DRAM), RAMBUS Dynamic Random Access Memory (RDRAM), and/or any other type of random access memory device. In another embodiment, the machine accessible medium may be non-volatile memory, such as flash memory, Read Only Memory (ROM), Electrically Erasable Programmable Read Only Memory (EEPROM), and/or any other desired type of memory device. The machine accessible medium may store data, including instructions to be scheduled according to embodiments of the present invention.

The system also includes an instruction scheduler 324 to schedule instructions according to embodiments of the present invention. The instruction scheduler 324 may be implemented in hardware, such as in the processor itself, or may be part of a compiler 322 stored in a machine-accessible medium 320 on the system.

The system may also include various other well known components. The processor and machine-accessible media may be communicatively coupled using a bridge/memory controller 326, and the processor 328 may be capable of executing instructions stored in the machine accessible medium. The bridge/memory controller may be coupled to a graphics controller, and the graphics controller may control the output of display data on a display device. Similarly, an audio adapter may be coupled to the bridge/memory controller to control the output of audio to a speaker. The bridge/memory controller may be coupled to one or more buses. A host bus controller, such as a Universal Serial Bus (USB) host controller may be coupled to the bus(es) and a plurality of devices may be coupled to the USB. For example, user input devices such as a keyboard and mouse may be included in the data processing device for providing input data. The data processing device may additionally include a network interface (e.g., a network interface card and/or a modem) capable of coupling the device to a network.

Thus, a method, machine readable medium, and system for constructing a dependence graph having a linear number of edges and at least one tie vertex are disclosed. In the above description, numerous specific details are set forth. However, it is understood that embodiments may be practiced without these specific details. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

I claim:

1. A method for scheduling computer instructions using a computer processor and memory coupled to a machine accessible medium, comprising:

constructing a tree having a plurality of nodes, wherein each of the plurality of nodes represents one or more memory locations, each node including attributes for children of the node, a parent of the node, a last cut vertex for the node, and fan vertices for the node;

receiving a request to create a vertex of a dependence graph, the vertex corresponding to a node within the plurality of nodes, wherein the vertex represents one of a machine instruction and a pseudo instruction;

adjusting a frontier of nodes in the tree to envelope the node, the frontier of nodes including a group of nodes that are associated with a cut vertex or a fan vertex, wherein the frontier is to track nodes in the tree that are relevant to at least one future request to create a vertex of the dependence graph, adjusting the frontier including inspection of the parent and child attributes of the node to determine a location of the node in relation to the frontier;

creating the vertex and at least one predecessor edge in the dependence graph, the predecessor edge to indicate dependence of vertices of the dependence graph, creation of the vertex being based at least in part on the last cut vertex attribute or the fan vertices attribute of the node; and scheduling computer instructions based on the dependence graph.

2. The method of claim 1, wherein a pseudo instruction provides for tying together dependences on two or more nodes of the plurality of nodes.

3. The method of claim 1, wherein the request corresponds to a read of at least one memory location associated with the node or a write of one at least one memory location associated with the node.

4. The method of claim 1, wherein adjusting the frontier comprises moving the frontier down to envelop the node if the node is below the frontier and moving the frontier up to envelop the node if the node is above the frontier.

5. The method of claim 4, wherein moving the frontier down comprises finding the node's nearest ancestor in the frontier, and operating on the ancestor as if a write to it occurred, and recording that write as the more recent write for all nodes on the path from the original node up to its ancestor on the frontier.

6. The method of claim 4, wherein moving the frontier up comprises recursively gathering nodes and recording which nodes are on the frontier.

7. The method of claim 1, wherein at least one tie vertex is created in addition to the requested vertex, the tie vertex to tie together dependencies on two or more nodes of the plurality of nodes.

8. The method of claim 7, wherein the request corresponds to a reference to the one or more memory locations represented by the node.

9. The method of claim 1, wherein the children attribute indicates children of the node that are on or above the frontier, and the parent attribute indicates the parent of the node if the node is below the frontier.

10. The method of claim 1, wherein the last cut vertex attribute indicates the most recent cut vertex for the node if the node is on the frontier, and the fan vertices attribute indicates a set of fan vertices for the node that are required to come after the most recent cut vertex if the node is on the frontier.

11. A method comprising:
constructing a tree having a plurality of nodes, wherein each of the plurality of nodes represents one or more memory locations, each node including attributes for children of the node, a parent of the node, a last cut vertex for the node, and fan vertices for the node;
scheduling computer instructions based on relative positions of the plurality of nodes within the tree and based on a series of requests, each of the series of requests being related to one of the plurality of nodes in the tree, wherein the instructions include at least one of machine instructions or pseudo instructions, wherein the scheduling of instructions includes:
receiving a request to create a vertex of a dependence graph corresponding to a node within the plurality of nodes,
maintaining a frontier of nodes in the tree, the frontier of nodes including a group of nodes that are associated with a cut vertex or a fan vertex, wherein the frontier tracks nodes in the tree that are relevant to future requests,
adjusting the frontier to envelope the node including inspection of the parent and child attributes of the node to determine a location of the node in relation to the frontier, and
creating the vertex and at least one predecessor edge in the dependence graph, the predecessor edge to indicate dependence of vertices of the dependence graph, creation of the vertex being based at least in part on the last cut vertex attribute or the fan vertices attribute of the node; and
executing the scheduled computer instructions.

12. The method of claim 11, wherein a pseudo instruction provides for tying together dependences on two or more nodes of the plurality of nodes utilizing a tie vertex.

13. A system comprising:
a processor;
memory coupled to the processor to store data, the data comprising computer instructions to be scheduled, wherein the computer instructions to be scheduled include at least one of machine instructions or pseudo instructions; and
an instruction scheduler to schedule the computer instructions based on relative positions of a plurality of nodes within a hierarchical tree and based on a series of requests, each node including attributes for children of the node, a parent of the node, a last cut vertex for the node, and fan vertices for the node, wherein the instruction scheduler is to:
receive a request to create a vertex of a dependence graph corresponding to a node within the plurality of nodes,
maintain a frontier of nodes in the hierarchical tree, the frontier of nodes including a group of nodes that are associated with a cut vertex or a fan vertex, wherein the frontier tracks nodes in the hierarchical tree that are relevant to future requests to create vertices of the dependence graph,
adjust the frontier of the hierarchical tree to envelope the node including inspection of the parent and child attributes of the node to determine a location of the node in relation to the frontier, and
create the vertex and at least one predecessor edge in the dependence graph, the predecessor edge to indicate dependence of vertices of dependence graph, creation of the vertex being based at least in part on the last cut vertex attribute or the fan vertices attribute of the node.

14. The system of claim 13, wherein the instruction scheduler is part of a compiler.

15. The system of claim 13, wherein a pseudo instruction provides for tying together dependences on two or more nodes of the plurality of nodes utilizing a tie vertex.

16. The system of claim 13, wherein the series of requests comprises one or more requests corresponding to a read of at least one memory location and one or more requests corresponding to a write of at least one memory location.

17. An article of manufacture comprising a machine-accessible medium having stored thereon instructions which, when executed by a machine, cause the machine to:
construct a tree having a plurality of nodes, wherein each of the plurality of nodes represents one or more memory locations, each node including attributes for children of the node, a parent of the node, a last cut vertex for the node, and fan vertices for the node;
receive a request to create a vertex of a dependence graph, the vertex corresponding to a node within the plurality of nodes, wherein the vertex represents one of a machine instruction and a pseudo instruction;
adjust a frontier of nodes in the tree to envelope the node, the frontier of nodes including a group of nodes that are associated with a cut vertex or a fan vertex, wherein the frontier is to track nodes in the tree that are relevant to at least one future request to create a vertex of the dependence graph, adjusting the frontier including inspection of the parent and child attributes of the node to determine a location of the node in relation to the frontier;
create the vertex and at least one predecessor edge in the dependence graph, the predecessor edge to indicate dependence of vertices of the dependence graph, creation of the vertex being based at least in part on the last cut vertex attribute or the fan vertices attribute of the node;
schedule computer instructions based on the dependence graph; and
execute the scheduled instructions.

18. The article of manufacture of claim 17, wherein a pseudo instruction provides for tying together dependences on two or more nodes of the plurality of nodes.

19. The article of manufacture of claim 17, wherein the instructions further include instructions that, when executed by the machine, further cause the machine to update one or more attributes associated with the node.

20. The article of manufacture of claim 17, wherein the instructions further include instructions that, when executed by the machine, further cause the machine to create at least one tie vertex, the tie vertex to tie together dependencies on two or more nodes of the plurality of nodes.

* * * * *